US012537668B2

(12) United States Patent
Hong et al.

(10) Patent No.: US 12,537,668 B2

(45) Date of Patent: Jan. 27, 2026

(54) AUTHENTICATION MECHANISM FOR COMPUTATIONAL STORAGE DOWNLOAD PROGRAM

(71) Applicant: Samsung Electronics Co., Ltd., Gyeonggi-do (KR)

(72) Inventors: Ilgu Hong, Santa Clara, CA (US); Changho Choi, San Jose, CA (US); Mohammad Nasim Imtiaz Khan, Rancho Cordova, CA (US)

(73) Assignee: Samsung Electronics Co., Ltd (KR)

( * ) Notice: Subject to any disclaimer, the term of this patent is extended or adjusted under 35 U.S.C. 154(b) by 393 days.

(21) Appl. No.: 17/879,502

(22) Filed: Aug. 2, 2022

(65) Prior Publication Data

US 2023/0379142 A1 Nov. 23, 2023

Related U.S. Application Data

(60) Provisional application No. 63/342,856, filed on May 17, 2022.

(51) Int. Cl.

*H04L 9/08* (2006.01)
*H04L 9/32* (2006.01)

(52) U.S. Cl.

CPC .......... *H04L 9/0822* (2013.01); *H04L 9/0894* (2013.01); *H04L 9/3263* (2013.01)

(58) Field of Classification Search

CPC ... H04L 9/0822; H04L 9/0894; H04L 9/3263; H04L 9/0643; H04L 9/3247;

(Continued)

(56) References Cited

U.S. PATENT DOCUMENTS 6,064,741 A 5/2000 Horn et al.
6,928,550 B1 8/2005 Le Pennec et al.

(Continued)

FOREIGN PATENT DOCUMENTS

CN 112953970 6/2021
KR 10-1078546 11/2011

(Continued)

OTHER PUBLICATIONS

Li Jin, et al., "Identity-Based Encryption with Outsourced Revocation in Cloud Computing", Ieee Transactions on Computers 64.2, pp. 425-437, Oct. 21, 2013.

(Continued)

*Primary Examiner* — Taghi T Arani
*Assistant Examiner* — Pegah Barzegar
(74) *Attorney, Agent, or Firm* — The Farrell Law Firm, P.C.

(57) ABSTRACT

A method to exchange and manage a key is provided. The method includes receiving, at a computational storage device (CSD), a user certificate ($CA_{user}$) that is generated based on a public key of a user ($PU_{user}$); extracting, at the CSD, the $PU_{user}$ using a public key of the certificate authority ($PU_{ca}$); generating, at the CSD, an encryption program key; encrypting, at the CSD, the encryption program key using the $PU_{user}$ to generate an encrypted encryption program key; and storing, at the CSD, the encrypted encryption program key.

19 Claims, 9 Drawing Sheets

(58) Field of Classification Search

CPC ... H04L 9/3297; H04L 9/0825; H04L 9/0861; H04L 9/50; G06F 21/577; G06F 21/79; G06F 9/3836; G06F 18/22

USPC .......................................................... 713/171

See application file for complete search history.

(56) References Cited

U.S. PATENT DOCUMENTS 6,952,475 B1 10/2005 Horn et al.
6,990,583 B2 * 1/2006 Matsuyama .......... H04L 9/3268 713/168
7,240,194 B2 * 7/2007 Hallin .................... G06F 21/33 726/2
8,010,804 B2 8/2011 Murase et al.
8,538,887 B2 * 9/2013 Yoshino .............. H04L 63/0442 705/52
8,707,029 B2 4/2014 Brand et al.
8,761,401 B2 * 6/2014 Sprunk ................. H04L 9/0844 380/278
9,386,045 B2 * 7/2016 Kgil ...................... H04L 63/205
10,505,736 B1 * 12/2019 Meixler ................ H04L 9/3236
10,601,795 B2 * 3/2020 Wang .................... H04L 63/061
10,652,240 B2 5/2020 Brand
10,742,421 B1 * 8/2020 Wentz ................... H04L 9/0897
10,805,087 B1 * 10/2020 Allen ...................... G06F 21/57
11,088,831 B2 * 8/2021 Feng ..................... H04L 9/0866
11,405,370 B1 * 8/2022 Grzybowski ......... G06F 21/602
11,764,968 B2 * 9/2023 Huber ..................... H04L 67/01 713/168
11,934,323 B2 * 3/2024 Kumar .................. H04L 9/0825
2002/0026578 A1 * 2/2002 Hamann ............... H04L 9/3263 713/159
2010/0293373 A1 * 11/2010 McBrearty ............ H04L 9/3236 713/168
2013/0111212 A1 * 5/2013 Baltes ..................... G06F 21/64 713/176
2014/0075193 A1 * 3/2014 Wang .................... H04L 9/0897 713/171
2014/0173686 A1 * 6/2014 Kgil ...................... H04L 63/205 726/1
2016/0028551 A1 * 1/2016 Hussain .................. H04L 63/06 713/156
2017/0171174 A1 * 6/2017 Campagna ............ H04L 63/062
2017/0195298 A1 * 7/2017 Brand ................... H04L 9/0891
2017/0222801 A1 * 8/2017 Le Saint ............. H04W 12/041
2018/0219678 A1 * 8/2018 Medvinsky ........... H04L 9/3268
2019/0312722 A1 * 10/2019 Brannon ............. H04L 63/0823
2021/0279307 A1 * 9/2021 Bartels .................... G06F 21/44
2021/0334415 A1 * 10/2021 Yanamadala ......... G06F 21/552
2022/0116455 A1 * 4/2022 Raghunath .......... H04L 41/5009
2022/0231863 A1 * 7/2022 Agarwal ............... H04L 63/126
2022/0311609 A1 * 9/2022 Rao ........................... H04L 9/14
2023/0021047 A1 * 1/2023 Ammar ................. H04L 9/3239
2023/0097712 A1 * 3/2023 Sullivan .............. H04L 63/1466 713/171
2023/0216863 A1 * 7/2023 Visen .................... H04L 9/3263 726/4
2023/0379142 A1 * 11/2023 Hong .................... H04L 9/0894
2024/0187221 A1 * 6/2024 Nagaraja ............... H04L 9/0825

FOREIGN PATENT DOCUMENTS

KR 10-2013-0021774 3/2013
KR 10-2016-0085143 7/2016
KR 10-2209988 2/2021
KR 10-2209989 2/2021
WO WO 2017/104899 6/2017
WO WO 2018/008800 1/2018

OTHER PUBLICATIONS

Lee, Dae-Hwi, et al., "A Lightweight Authentication and Key Agreement Schemes for IoT Environments", Sensors 20.18, 19 pages, Sep. 16, 2020.

* cited by examiner

| A | e(KEY a) | PU a | SLA a |
|---|---|---|---|
| B | e(KEY b) | PU b | SLA b |
| ... | ... | | |

AUTHENTICATION MECHANISM FOR COMPUTATIONAL STORAGE DOWNLOAD PROGRAM

PRIORITY

This application is based on and claims priority under 35 U.S.C. § 119(e) to U.S. Provisional Patent Application Ser. No. 63/342,856, filed on May 17, 2022, the entire contents of which are incorporated herein by reference.

TECHNICAL AREA

The present disclosure relates generally to computational storage (CS) security for downloadable programs.

BACKGROUND

CS devices are electronic devices that may process data directly where it is stored. This approach may reduce the movement of large amounts of data to external processing and deliver benefits including reduced latency and bandwidth usage, as well as energy savings.

CS devices are designed to offload computation overhead of host CPUs to storage devices, which may improve processing efficiency for large data sets. For example, some systems may be designed to provide CS services over nonvolatile memory express (NVME) devices, which focus on providing a general offloading platform. However, offload programing may be vulnerable to attacks. Therefore, solutions are needed which improve CS security to reduce the risk of attacks.

SUMMARY

The present disclosure has been made to address at least the disadvantages described above and to provide at least the advantages described below.

According to an aspect of the disclosure, a method to generate and distribute a program encryption key is provided. The method includes receiving, at a computational storage device (CSD), a user certificate ($CA_{user}$) that is generated based on a public key of a user ($PU_{user}$); extracting, at the CSD, the $PU_{user}$ using a public key of the certificate authority ($PU_{ca}$); generating, at the CSD, an encryption program key; encrypting, at the CSD, the encryption program key using the $PU_{user}$ to generate an encrypted encryption program key; and storing, at the CSD, the encrypted encryption program key.

According to another aspect of the disclosure, a method to build a secure download program image format stored in a host is provided. The method includes encrypting a plain binary downloadable program using an encryption program key to generate an encrypted cipher; storing the encrypted cipher in the secure download program image format; performing at least one of a vulnerability and a defectiveness check on the plain binary downloadable program; in response to successfully performing the at least one of the vulnerability and the defectiveness check, generating a hash value for the plain binary downloadable program and encrypting the hash value using a private key of a certificate authority ($PR_{ca}$) to generate an encrypted hash value; and storing the encrypted hash value as a digital signature in the secure download program image format.

According to another aspect of the disclosure, a method for authenticating a download program with a secure download program format is provided. The method includes decrypting a digital signature stored in the secure download program format using a $PU_{ca}$ to obtain a first hash value; decrypting an encrypted cipher stored in the secure download program format using an encryption program key to obtain a plain binary downloadable program; generating a second hash value for the plain binary downloadable program; and comparing the first hash value to the second hash value; in response to the first hash value being equal to the second hash value, authenticate the download program.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
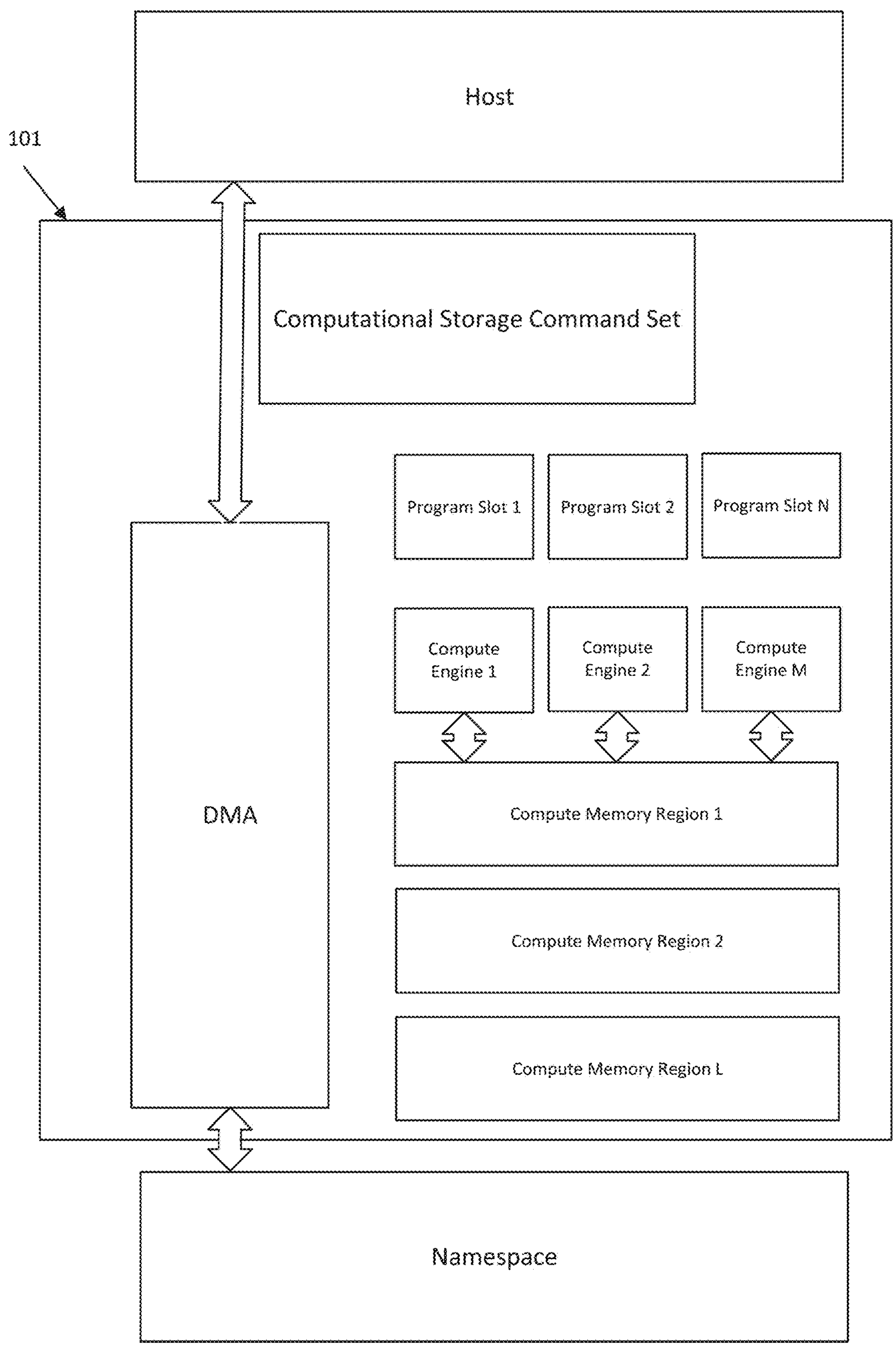
FIG. 1 illustrates a computational storage architecture, according to an embodiment.

The following disclosure provides a method to build a secure download program image, which improves the security of downloading a program in CS systems. Additionally, the present disclosure provides an authentication and data integrity check mechanism for the CS download program. Further, a safe key (symmetric crypto key) exchange mechanism for the CS download program is provided herein. As discussed below, the present disclosure provides a way to detect affected/modified (e.g., compromised) data, thereby protecting the CSD system from a malicious download program.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices utilizing storage devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "$2^{nd}$," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, firmware, or combination thereof, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The present disclosure improves CS security by providing offload program protection, a CS downloadable program, and a way to perform an authentication and data integrity check in a CSD. As disclosed herein, certain elements are abbreviated using subscripts (e.g., $CA_{user}$, $PU_{user}$, etc.). For convenience of description, these abbreviated elements may or may not necessarily use subscripts to refer to the abbreviated elements (e.g., "$CA_{user}$ may be equivalent to "CA user", "$PU_{user}$" may be equivalent to "PU user", etc.).

FIG. 1 illustrates a computational storage architecture, according to an embodiment.

Referring to FIG. 1, a CSD 101 may be composed of at least one program slot, or multiple program slots up to n program slots. Program slots may be defined as a space to keep a fixed or user defined download program. Also, the CSD may include at least one compute engine, or multiple compute engines up to M compute engines. The compute engine may be logic to process a program, and may perform computations using memory regions (e.g., memory space used as input/output by a program).

Accordingly, the configuration shown in FIG. 1 may provide a computational storage service (CSS). The CSS may provide access to algorithms and functions acting on a CS drive, and may include, for example, a discovery method (e.g., a report including CS feature information, status information and/or capability information), a program register method (e.g., a programmable CSS), a compute resource (e.g., a memory) allocation/deallocation method, a data movement method between a compute resource (e.g., a memory) and namespace, a compute resource (e.g., a memory) access method, and a registered program execution method.

Since a user can register a user defined program through a download program interface of a CSD, this introduces a new security vulnerability with CSD.

Figure 2:
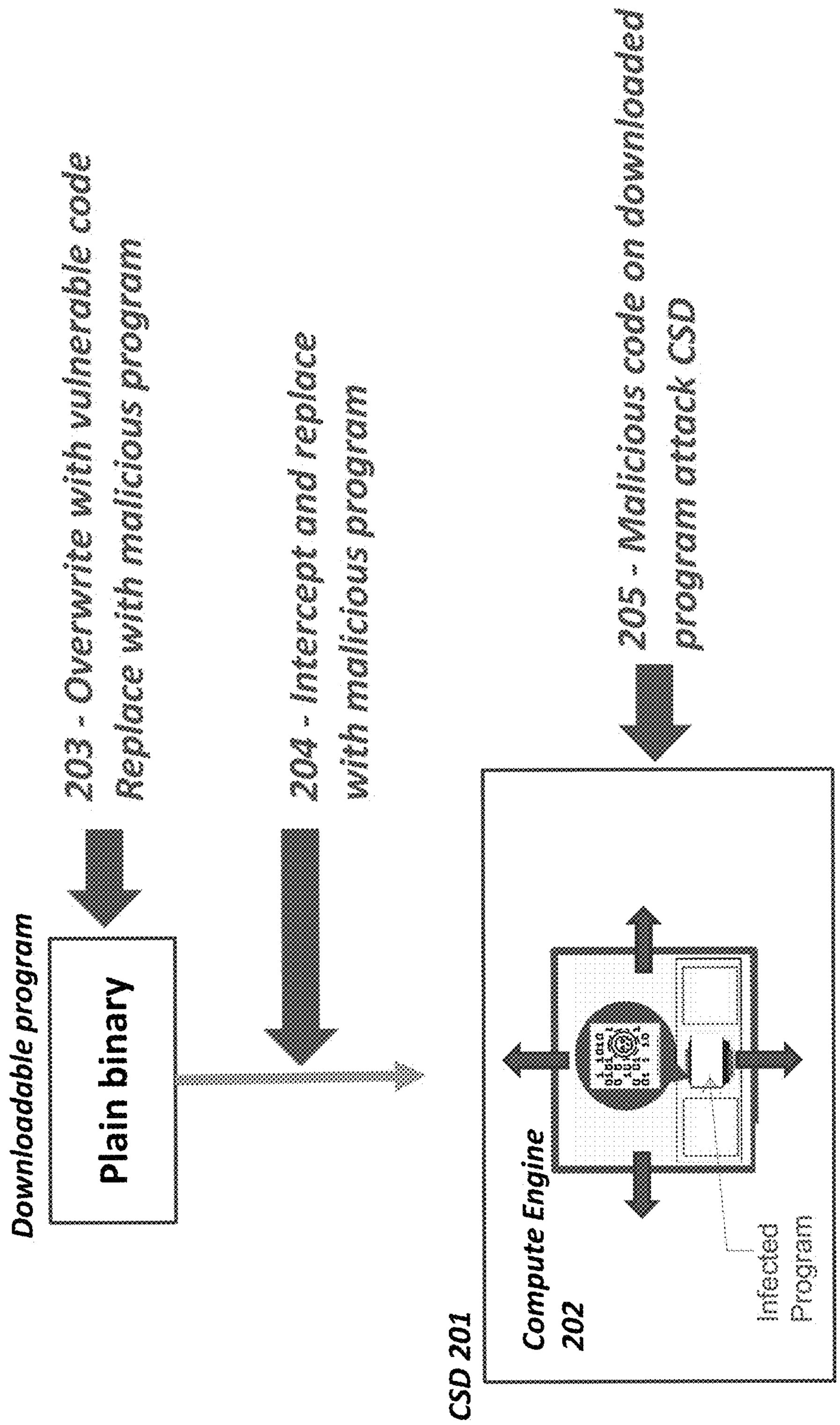
FIG. 2 illustrates a possible security threat model for a downloadable program, according to an embodiment.

FIG. 2 illustrates a possible security threat model for a downloadable program, according to an embodiment.

Referring to FIG. 2, three threat vulnerability locations are identified. First, a download program could be attacked by replacing a download program image with malicious binary code, or be modified by adding vulnerable code in existing binary at location 203, where it is stored on the host. The expressions "plain binary" or "binary code", may refer to a download program vulnerable to attacks since it is not encrypted. Second, a download program could be replaced by an attacker when transferring a download program image to the CSD 201 at location 204. Third, malicious code could attack the CSD 201 system when it is executed inside the CSD 201 and affect the compute engine 202 at location 204.

From threat model discussed above, the following three principles, shown below in Table 1, may be extracted.

TABLE 1

| | |
|---|---|
| 1. | CS download program image must be kept securely in the host. |
| 2. | CS download program image must be transferred securely. |
| 3. | CSD must detect attack of the CS download program image. |

One way to securely keep a CS download program image may be to locate a CS download program image on a read only medium or dedicated secure storage to prevent modification from an unauthorized user. This configuration, however, may not be realistic for real world workload environments.

For performing a secure transfer, large scale systems may have a session key based encrypted data transfer mechanism, but this may be expensive to operate, and may require third-party authorization services.

To detect an authentication attack in a CSD, a user may register a public key securely to the CSD and encrypt a CS download program image with a private key of a user. Then, the CSD could authenticate a CS download program image by decrypting a CS download image with a public key of user. However, a user private/public key may need to be secured, and the CSD should have a valid user public key.

Therefore, the following three principles may be realized, as shown in Table 2.

TABLE 2

| | |
|---|---|
| 1. | User and CSD must distribute symmetric crypto key securely. |
| 2. | CS download program image must be kept as encrypted in host. |
| 3. | CSD must detect attack of the CS download program image. |

By modifying a CS download image as an encrypted format, a secure transfer requirement between a user and a CSD can be achieved.

Secure key distribution methods will now be described.

To achieve authentication in a method for downloading a CS program image with cryptography (crypto), securely distributing a crypto key between a user and a CSD may be required.

For example, a symmetric master key based key distribution mechanism may be used to achieve authentication and may require a third-party key distribution center (KDC). An initial time may be required to register a master of both entries (a user and a CSD) to the KDC. The KDC may generate a key and build a message which can be extracted by an entry with a master key.

Some drawbacks for CSD using a key distribution with a symmetric master key may be that a master key may need to be registered with a third-party before key distribution, which may require an additional secure method to register a master key of a CSD. In addition, the KDC master key may need to be transferred safely, which may also require an additional secure method. Furthermore, key generation may be done by the KDC, which may not be secure. Also, the keys in the KDC should be protected at all times.

Another secure key distribution method used to achieve authentication may be a simple key distribution method using asymmetric keys (private/public key). One drawback of this technique is that it may be vulnerable to a man-in-middle attack. Key distribution methods using asymmetric keys that avoid man-in-middle attacks may require additional steps to improve security. For example, one approach to avoid the man-in-middle attack may be to register a public key to another entry before key distribution, which may require additional messages to be exchanged to securely distribute keys. Alternatively, another approach may be to use a certificate during key distribution to improve security. However, in this approach, it may be necessary to rely on a third-party certificate authority (CA) (and the CA's public key) to use the certificate.

The following four principles, shown below in Table 3, may be achieved by the key distribution mechanism based on a CA with a CSD disclosed herein.

TABLE 3

| | |
|---|---|
| 1. | Provide a simple key distribution protocol. |
| 2. | CSD may achieve more reliability from a certificate of a user which was issued by a CA. |
| 3. | Certificate itself may include more useful information, such an identification (ID) of a user (e.g., a subject), issuer information, and a timestamp. |
| 4. | The role of the CA may be extended to be not only CA issuer but also CS download program management authority. |

As described herein, a certificate may be represented as "E (PR ca, [ID user |T| PU user])". E stands for encryption, PR stands for private key, PU stand for public key, stands for T means timestamp, and ID stands for identification.

Secure key distribution based on a CA within a CSS will now be described.

Figure 3A:
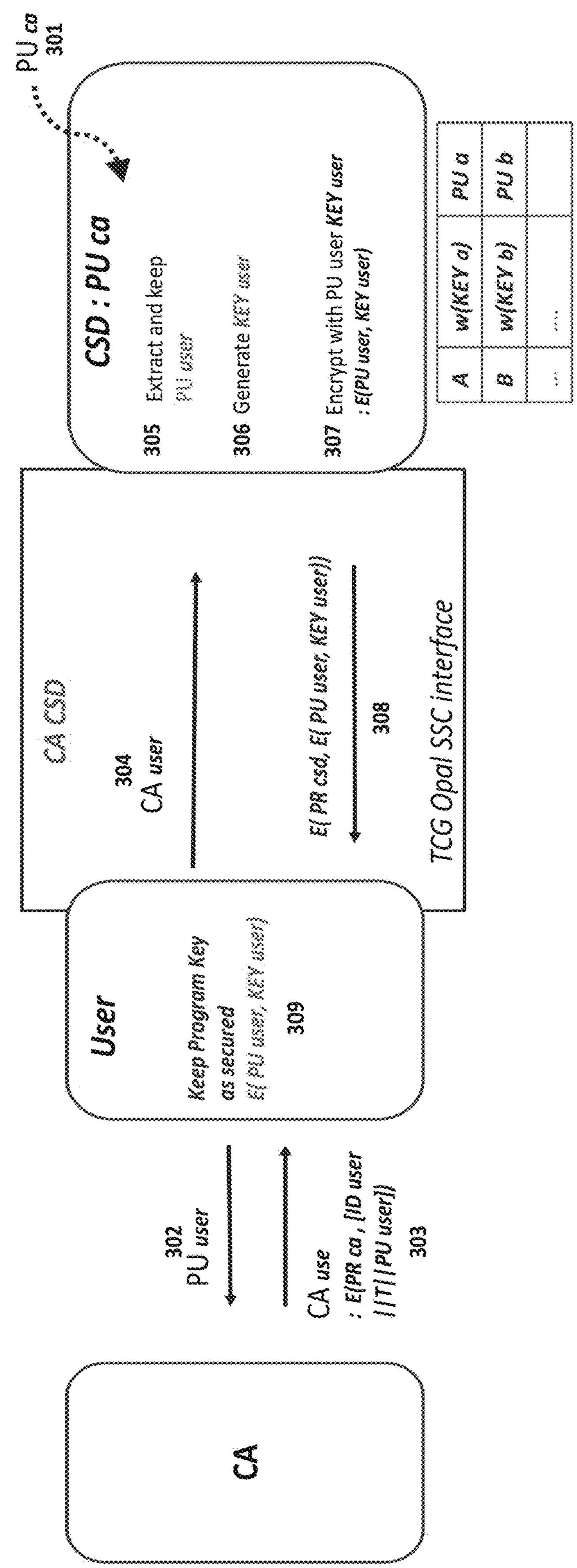
FIG. 3A and FIG. 3B illustrate key distribution mechanisms for a CSD based on a CA, according to various embodiments.
Figure 3B:
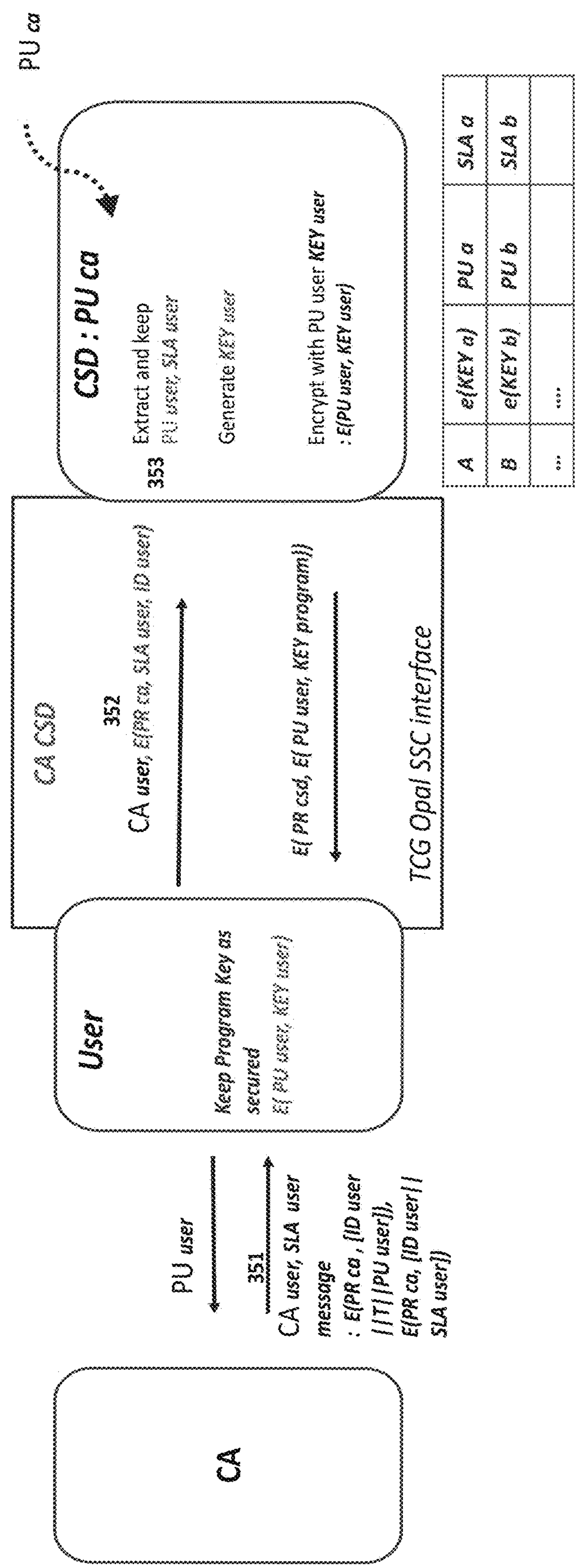

FIG. 3A and FIG. 3B illustrate key distribution mechanisms for a CSD based on a CA, according to various embodiments.

Referring to FIG. 3A and FIG. 3B, CA systems are shown. A CA may have multiple roles within a CSS. For example, the CA may provide public key infrastructure (PKI) as a default. By issuing a certificate for a user and a CSD, the CA may provide a notarization service for the public key of the user and the CSD. A certificate of CA ($CA_{csd}$) may be provided to users, who could use the CSD to offload application computation processing. The public key of the CA may be registered on a CSD through a Trusted Computing Group (TCG) opal storage secure subsystem class (SSC) interface.

FIG. 3A illustrates a default key distribution sequence (e.g., a key distribution flow), according to an embodiment. In step 301, the public key of the CA ($PU_{ca}$) is registered to the CSD. The CSD may create a $CA_{csd}$ that is known to the user. In step 302, a public key of a user ($PU_{user}$) is provided to the CA and, in step 303, a user receives a certificate of the user ($CA_{user}$) generated based on the user's public key with an encrypted message (denoted by "E(PR ca, [ID user ||T|| PU used]", where "E" followed by parenthesis denotes an encrypted message using "PR ca", which is the private key of the CA. In addition, "ID user" is the identification of the user; "T" is a time stamp; and "PU user" is the public key of the user).

Key distribution may begin by sending the $CA_{user}$ to the CSD in step 304. The CSD extracts the $PU_{user}$ and an ID of a user ($ID_{user}$) by decrypting $CA_{user}$ with a $PU_{ca}$ in step 305 and securely stores it. Then, the CSD generates a program crypto key of a user ($KEY_{user}$) (e.g., a symmetric program crypto key of the user) using a key derivation function (KDF) in step 306 and securely stores it. $ID_{user}$, $PU_{user}$, and a $KEY_{user}$ may be securely stored in a program key table inside the CSD. During this time, $KEY_{user}$ may be saved in an encrypted format with a key encrypt key (KEK) of the CSD.

The program key table inside the CSD may include an ID field, a program key (crypto key) field, and a public key field, as shown below in Table 4:

TABLE 4

| ID | Program Key | Public Key |
| --- | --- | --- |
| A | E( KEK, Key a) | PU a |
| B | E( KEK, Key b) | PU b |

The ID and public key fields may be extracted from the CA. The program key field may be generated by the CSD and kept in a secure encrypted format.

Referring back to FIG. 3A, the CSD generates a key message which encrypts $KEY_{user}$ with $PU_{user}$ in step 307, which guarantees that the user can securely extract $KEY_{user}$ by decrypting the key message with the private key of the user ($PR_{user}$). The CSD may perform an additional encryption for the key message with a private key of the CSD ($PR_{csd}$) before sending the key message to the user in step 308, which may ensure the key message is sent from the CSD (e.g., the message could be decrypted with $PU_{csd}$). The user may extract the key message (E ($PU_{user}$, $Key_{user}$)) by decrypting the message with the $PU_{csd}$ and keep the key message in a secure place in step 309 (e.g., store the key message encrypted with $PU_{user}$). The key distribution system may use a modified TCG opal SSC interface of SSD.

FIG. 3B illustrates an extension of a key distribution mechanism to register a service level agreement of the user ($SLA_{user}$), according to an embodiment. For convenience of description, descriptions of steps similar to those of FIG. 3A may be omitted, however one of ordinary skill in the art will recognize descriptions pertaining to the steps of FIG. 3A may also be applicable to FIG. 3B.

A program slot (PS) is a limited resource, which may need to be restricted based on an SLA by providing an SLA value during the key distribution process.

Referring to FIG. 3B, the CA may assume an SLA issuer role by issuing an SLA message in step 351, which may control a runtime PS allocation. The SLA message may be formed as E(PR ca, [ID user, SLA user]). Therefore, in step 352 the $SLA_{user}$ and $ID_{user}$ is encrypted with a private key of a CA. The message may be sent when $CA_{user.}$ is registered. The CSD may extract $SLA_{user}$ in step 353 and save it on a program key table. In addition, the $SLA_{user}$ may be used to control a PS allocation when processing a CS download program request. For example, the CSD may check the SLA value when processing a download program and control PS allocation based on the SLA value.

Figure 4:
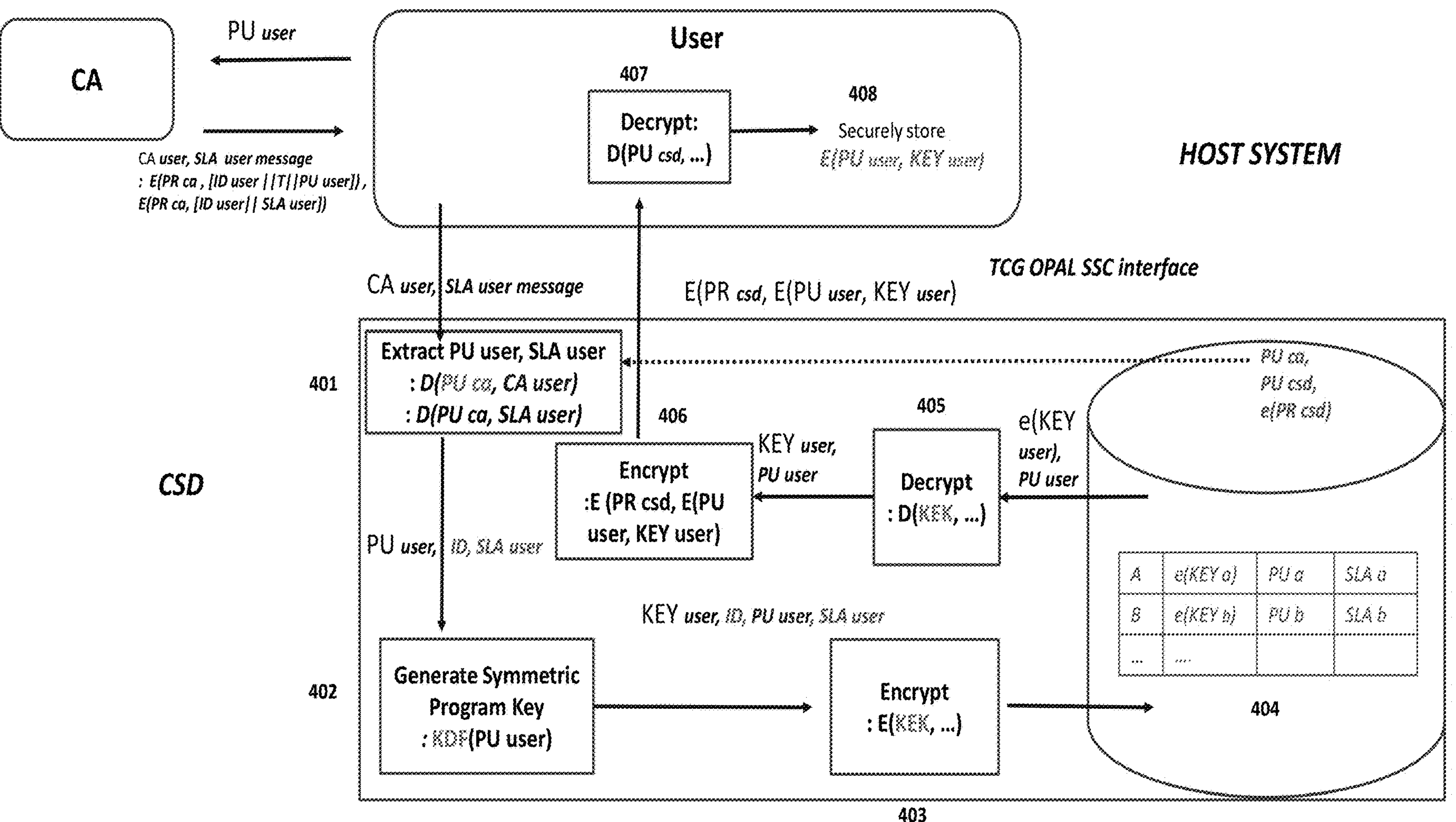
FIG. 4 illustrates a key distribution function inside a CSD, according to an embodiment.

FIG. 4 illustrates a key distribution function inside a CSD, according to an embodiment.

Referring to FIG. 4, given a $CA_{user}$ and $SLA_{user}$ message, the CSD extracts $PU_{user}$, $ID_{user}$, and $SLA_{user}$ in step 401. For a given CA user, the CSD may extract $PU_{user}$ by decrypting the CA with $PU_{CA}$. For a given SLA message, the CSD may extract $SLA_{user}$ by decrypting the SLA message with the $PU_{CA}$. Then, in step 402, the CSD generates a program key for the user using a KDF (e.g., based on $PU_{user}$), and it is encrypted with a KEK of the CSD in step 403 and saved securely. The CSD stores the $ID_{user}$, e($KEY_{user}$), $PU_{user}$, and $SLA_{user}$ on a program key table in step 404.

To provide the $KEY_{user}$ to the user, the CSD may build a key message by encrypting the $KEY_{user}$ with the $PU_{user}$, which guarantees that the user can extract the $KEY_{user}$ by performing decryption with the $PR_{user}$ in step 405. The CSD performs additional encryption for the key message with $PR_{csd}$, in step 406, which guarantees that this message was built by the CSD. A user may decrypt and extract the key message with $PU_{csd}$ in step 407 to validate the CSD sent this message, and store the key message in a secure place in step 408.

Accordingly, when the user needs to encrypt a program, $KEY_{user}$ may be extracted and used for the program encryption base on the following principles, shown below in Table 5.

TABLE 5

1. Key message is formed as E ($PU_{user}$, $KEY_{user}$).
2. E( D($PR_{user}$, KEY message), CS download program plain image).
3. D is decryption function, E is encryption function and each function's first parameter is a crypto key for that function.

A secure CS download program image format will now be described.

Figure 5:
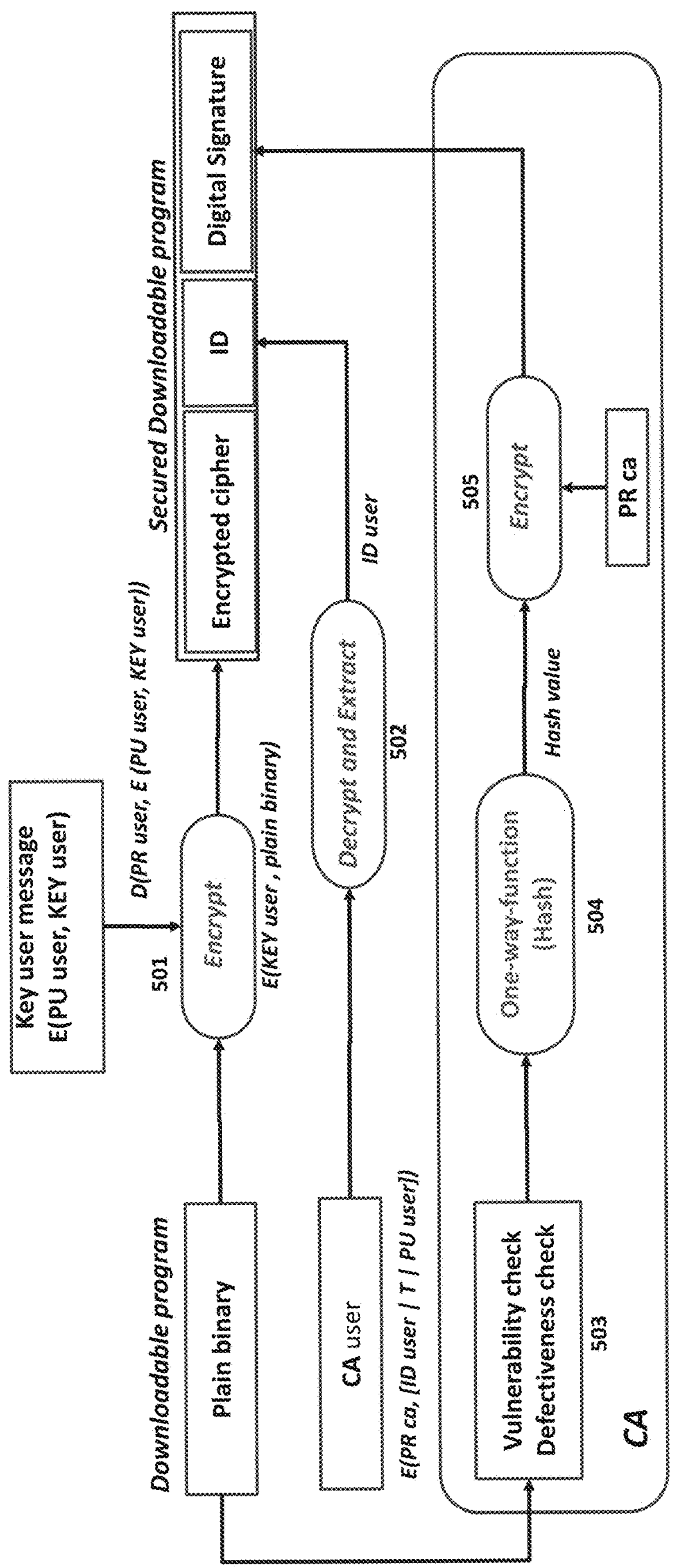
FIG. 5 illustrates a secure CS download program image format and a building procedure, according to an embodiment.

FIG. 5 illustrates a secure CS download program image format and a building procedure, according to an embodiment.

A secure downloadable program, as illustrated in FIG. 5, may improve the security of the downloadable program. To detect an attack from a malicious attacker, the CSD may provide an authentication mechanism for the download program, and the program may be saved in an encrypted format with a program key.

Referring to FIG. 5, a user encrypts a plain binary message with $KEY_{user}$ in step 501. As mentioned before, a key message may be formed as E($PU_{user}$, $Key_{user}$). A user extracts $Key_{user}$ by decrypting the Key message with $PR_{user}$. A user may append $ID_{user}$, which is extracted from the CA with $PU_{ca}$ in step 502. In step 503, a vulnerability check and/or a defectiveness check is performed on the plain binary (downloadable program). In response to the vulnerability check and/or a defectiveness check being successfully performed in step 503, the CA may provide a digital signature by extracting a hash value using one-way-hash function in step 504, and encrypting the hash value with $PR_{ca}$ in step 505. Accordingly, the CA may act as and provide a program authority role. A user may ask or request a digital signature by providing a CS program image to the CA. The CA may perform additional checks, such as a vulnerability check for the given CS download program image and provide the digital signature.

A secure CS download program image may be composed of an encrypted cipher (e.g., encrypted with $KEY_{user}$), an $ID_{user}$ (extracted from $CA_{user}$) and a digital signature (e.g., signed by a CA for the hash value of the plain program), and it may be stored in the host system.

Authentication of a CS download program image in a CSD will now be described.

Figure 6:
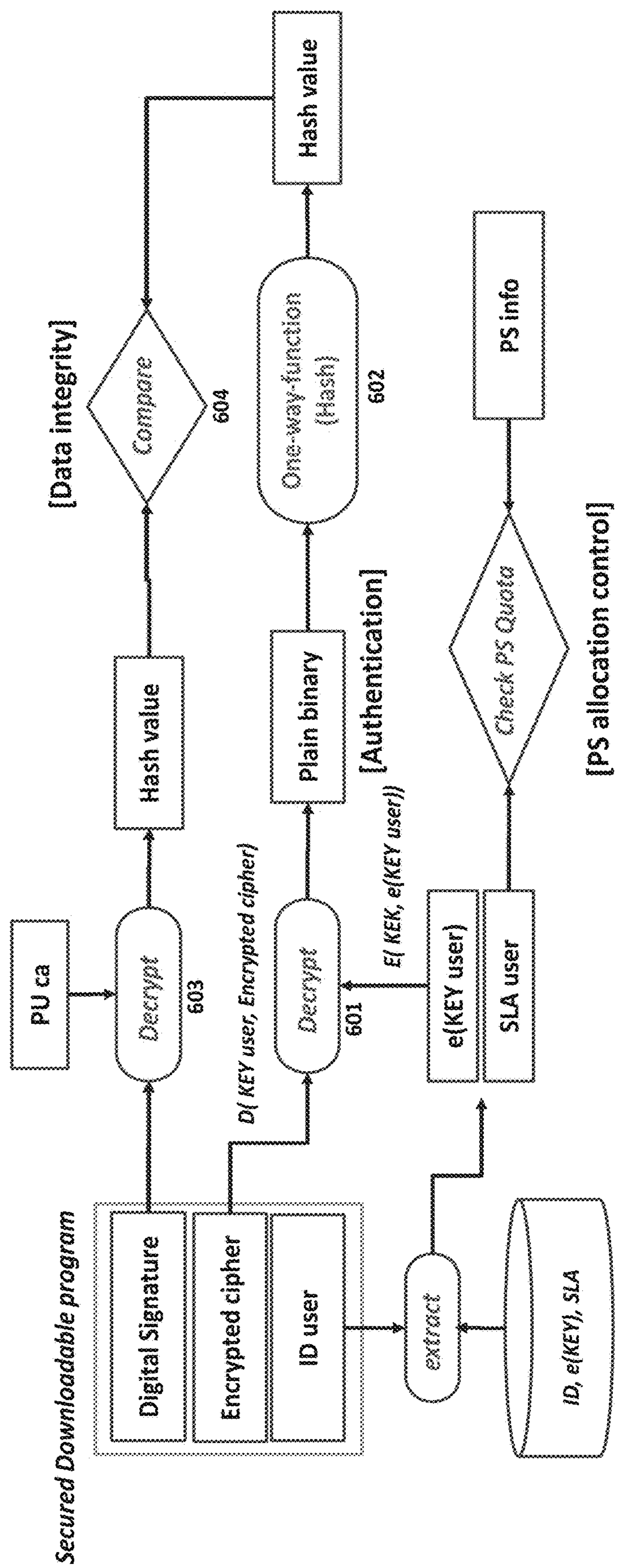
FIG. 6 illustrates an authentication and data integrity check procedure for the CS download program in a CSD, according to an embodiment.

FIG. 6 illustrates an authentication and data integrity check procedure for the CS download program in a CSD, according to an embodiment.

Referring to FIG. 6, in step 601, the CSD decrypts encrypted cipher data with $Key_{user}$ and generates a plain binary message. A $Key_{user}$ may be extracted from e(KEY user) by decrypting using a KEK of the CSD. This procedure may ensure that a program may be sent by a registered valid user. In step 602, the CSD generates a first hash value from the plain binary message with a one-way-function for preparing a data integrity and validation check. Next, in step 603, the CSD extracts a second hash value from a digital signature by decrypting a digital signature with a $PU_{ca}$. Then, in step 604, the CSD compares this second hash value with the first hash value from the plain binary message. If the first hash value is not the same as the second hash value, then someone may have modified the secure CS download program image in a host or while it is transferred, or if the CS download program image is not signed by the CA, the CSD will detect it and reject the CS download program request. Otherwise, the CSD may authorize the CS download program request when the first has value is the same as the second hash value and/or the CS download program image is signed by the CA.

Authentication architecture for a CS download program in a CSD will now be described.

Figure 7:
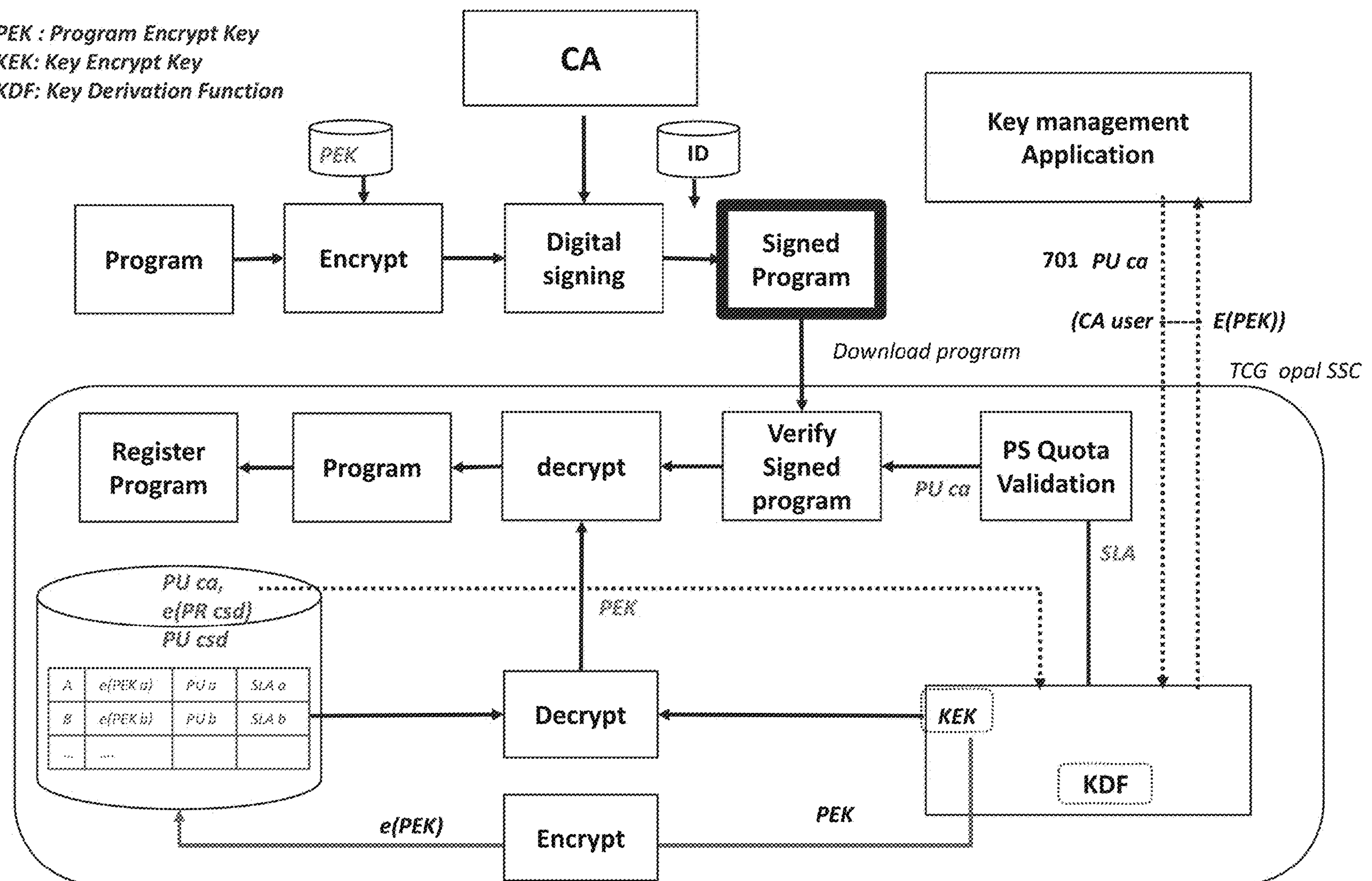
FIG. 7 illustrates an overall authentication architecture for a CS download command, according to an embodiment.

FIG. 7 illustrates an overall authentication architecture for a CS download command, according to an embodiment.

Referring to FIG. 7, the CSD provides a TCG Opal SSC interface to register a public key of CA ($PU_{ca}$) and provide key distribution for a user. When the system is initiated, the administrator (e.g., a key management application) may register $PU_{ca}$ to the CSD at step 701. The user may build a $CA_{user}$ and an $SLA_{user}$ message though the CA and store it securely. Then, the user may obtain a $Key_{user}$ message by registering a $CA_{user}$ and an $SLA_{user}$ message to the CSD through the TCG Opal SSC interface. The CSD will keep (or store) $Key_{user}$, $ID_{user}$, and $SLA_{user}$ in a program key table.

To perform key distribution, the CSD may provide a KDF, a one-way-function, an encrypt/decrypt function, and a securely stored program key table. To build a secure CS download program image, the system may need to provide an encrypt function (which is supported by a CSD decrypt function). The user may need to securely store a key user message (E ($PU_{user}$, $KEY_{user}$)) and CA user. On the other hand, it may be possible that the system may store a key user message (E (PU user, KEY user)) and CA user securely and provide an interface to extract it when a secure CS download image is built or generated. As mentioned above, a CA may perform a program authority role when building a secure CS download program image. This may require a system to check a vulnerability of a program and system for a program validation before signing the program.

Additionally, a user may call a CS download program application program interface (API) to register a program. For the authentication procedure, a CSD may provide decryption, and a one-way-function. First, a CSD may extract an $SLA_{user}$ and a $Key_{user}$ based on an $ID_{user}$, and check a program slot (PS) quota with $SLA_{user}$ to determine whether the user is registered to download the program or not. If the user is registered to download the program, the CSD may decrypt the encrypted program image with a $Key_{user}$ and perform a validation check with a digital signature. After passing each step, the extracted downloaded program may be registered to a PS.

Figure 8:
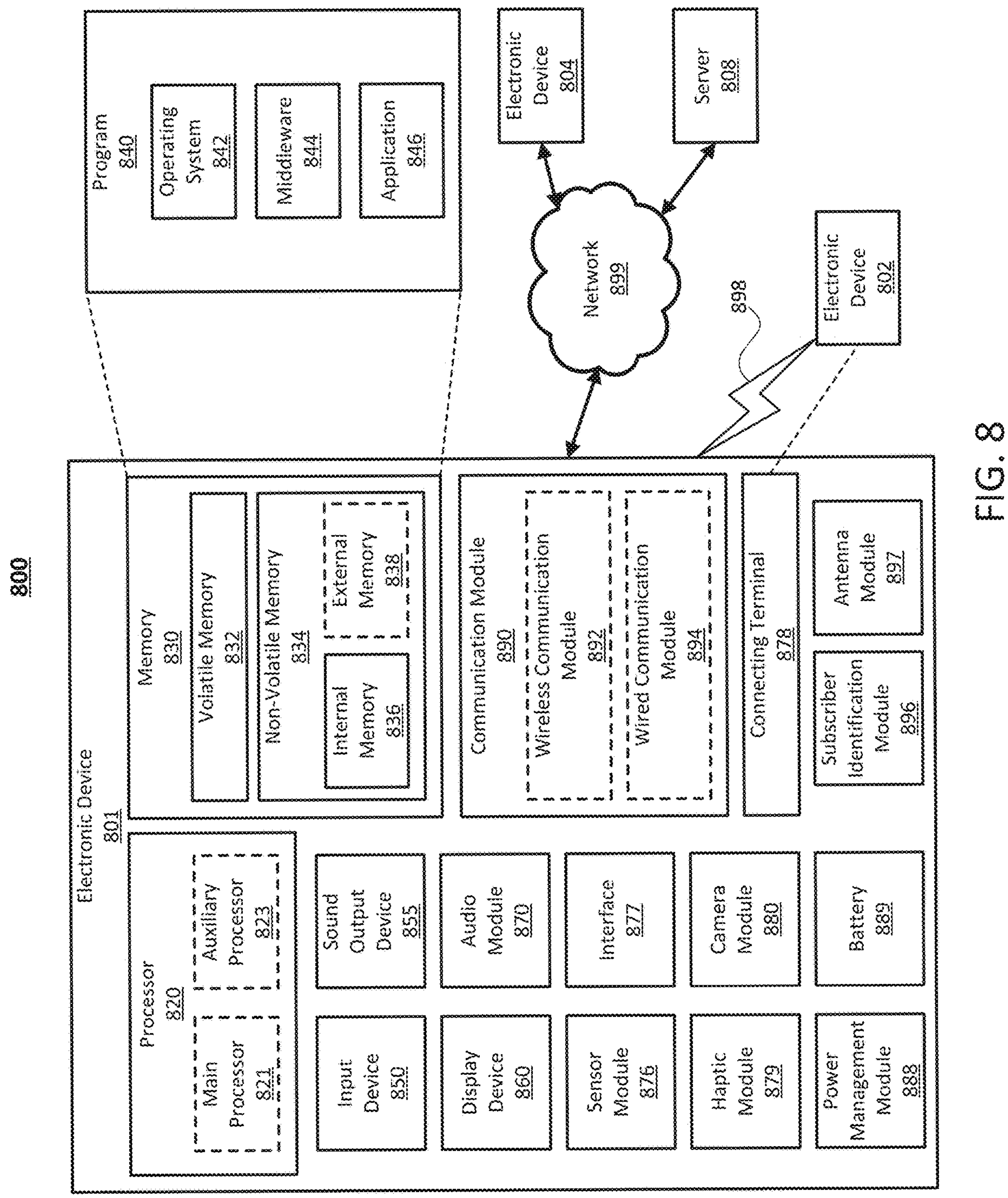
FIG. 8 illustrates an electronic device in a network environment, according to an embodiment.

FIG. 8 illustrates an electronic device in a network environment, according to an embodiment.

Referring to FIG. 8, the electronic device 801, e.g., a mobile terminal including GPS functionality, in the network environment 800 may communicate with an electronic device 802 via a first network 898 (e.g., a short-range wireless communication network), or an electronic device 804 or a server 808 via a second network 899 (e.g., a long-range wireless communication network). The electronic device 801 may communicate with the electronic device 804 via the server 808. The electronic device 801 may include a processor 820, a memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) 896, or an antenna module 897 including a GNSS antenna. In one embodiment, at least one (e.g., the display device 860 or the camera module 880) of the components may be omitted from the electronic device 801, or one or more other components may be added to the electronic device 801. In one embodiment, some of the components may be implemented as a single integrated circuit (IC). For example, the sensor module 876 (e.g., a fingerprint sensor, an iris sensor, or an illuminance sensor) may be embedded in the display device 860 (e.g., a display).

The processor 820 may execute, for example, software (e.g., a program 840) to control at least one other component (e.g., a hardware or a software component) of the electronic device 801 coupled with the processor 820, and may perform various data processing or computations. As at least part of the data processing or computations, the processor 820 may load a command or data received from another component (e.g., the sensor module 876 or the communication module 890) in volatile memory 832, process the command or the data stored in the volatile memory 832, and store resulting data in non-volatile memory 834. The processor 820 may include a main processor 821 (e.g., a central processing unit (CPU) or an application processor, and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or execute a particular function. The auxiliary processor 823 may be implemented as being separate from, or a part of, the main processor 821.

The auxiliary processor 823 may control at least some of the functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to one embodiment, the auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by other component (e.g., the processor 820) of the electronic device 801, from the outside (e.g., a user) of the electronic device 801. The input device 850 may include, for example, a microphone, a mouse, or a keyboard.

The sound output device 855 may output sound signals to the outside of the electronic device 801. The sound output device 855 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. According to one embodiment, the display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. According to one embodiment, the audio module 870 may obtain the sound via the input device 850, or output the sound via the sound output device 855 or a headphone of an external electronic device 802 directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. The sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device 802 directly (e.g., wiredly) or wirelessly. According to one embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device 802. According to one embodiment, the connecting terminal 878 may include, for example, an HDMI connector, a USB connector, an SD card connector, or an audio connector (e.g., a headphone connector).

The haptic module 879 may convert an electrical signal into a mechanical stimulus (e.g., a vibration or a movement) or an electrical stimulus which may be recognized by a user via tactile sensation or kinesthetic sensation. According to one embodiment, the haptic module 879 may include, for example, a motor, a piezoelectric element, or an electrical stimulator.

The camera module 880 may capture a still image or moving images. According to one embodiment, the camera module 880 may include one or more lenses, image sensors, image signal processors, or flashes.

The power management module 888 may manage power supplied to the electronic device 801. The power management module 888 may be implemented as at least part of, for example, a power management integrated circuit (PMIC).

The battery 889 may supply power to at least one component of the electronic device 801. According to one embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor) and supports a direct (e.g., wired) communication or a wireless communication. According to one embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or a standard of the Infrared Data Association (IrDA)) or the second network 899 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. According to one embodiment, the antenna module 897 may include one or more antennas, and, therefrom, at least one antenna appropriate for a communication scheme used in the communication network, such as the first network 898 or the second network 899, may be selected, for example, by the communication module 890 (e.g., the wireless communication module 892). The signal or the power may then be transmitted or received between the communication module 890 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 801 and the external electronic device 804 via the server 808 coupled with the second network 899. Each of the electronic devices 802 and 804 may be a device of a same type as, or a different type, from the electronic device 801. All or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

One embodiment may be implemented as software (e.g., the program 840) including one or more instructions that are stored in a storage medium (e.g., internal memory 836 or external memory 838) that is readable by a machine (e.g., the electronic device 801). For example, a processor of the electronic device 801 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for authenticating a download program with a secure download program format, comprising:

encrypting a plain binary downloadable program using an encryption program key to generate an encrypted cipher;

storing the encrypted cipher in the secure download program format;

decrypting a digital signature stored in the secure download program format using a public key of a certificate authority ($PU_{ca}$) to obtain a first hash value of the digital signature;

decrypting the encrypted cipher stored in the secure download program format using the encryption program key to obtain the plain binary downloadable program;

generating a second hash value for the plain binary downloadable program;

comparing the first hash value of the digital signature to the second hash value of the plain binary downloadable program; and in response to the first hash value being equal to the second hash value, authenticating the download program, wherein the encryption program key is generated by a computational storage device (CSD) based on a user certificate issued by the certificate authority (CAuser).

2. The method of claim 1, further comprising:

extracting an identification (ID) of a user stored in the secure download program format;

obtaining the encryption program key from a program key storage table based on the ID of the user.

3. The method of claim 2, further comprising:

obtaining a service level agreement (SLA) corresponding to the encryption program key; and determining a program slot (PS) quota for the SLA and PS information.

4. The method of claim 2, wherein the program key storage table includes multiple entries, with each entry respectively including an ID of a user, the encryption program key, and a public key.

5. The method of claim 1, further comprising:

in response to the first hash value not being equal to the second hash value, determine that the download program is not authenticated for downloading.

6. The method of claim 1, wherein decrypting the encrypted cipher is performed by the CSD with a key encrypt key (KEK).

7. The method of claim 1, wherein decrypting the encrypted cipher is performed by the CSD with a program crypto key of a user ($KEY_{user}$).

8. The method of claim 1, further comprising:

storing, at the CSD, a first encrypted encryption program key with a first public key; and storing, at the CSD, a second encrypted encryption program key with a second public key.

9. The method of claim 1, further comprising:

receiving, at the CSD, a user certificate ($CA_{user}$) that is generated based on a public key of a user ($PU_{user}$);

extracting, at the CSD, the $PU_{user}$ using the $PU_{ca}$; and generating, at the CSD, the encryption program key.

10. The method of claim 9, wherein extracting, at the CSD, the $PU_{user}$ using the $PU_{ca}$ further includes extracting a service level agreement (SLA) for determining a program slot (PS) quota.

11. The method of claim 9, wherein generating, at the CSD, the encryption program key further includes generating a symmetric program key using a key derivation function (KDF).

12. The method of claim 9, further comprising:

encrypting, at the CSD, the encryption program key using the $PU_{user}$ to generate an encrypted encryption program key; and storing, at the CSD, the encrypted encryption program key.

13. The method of claim 12, wherein the encrypted encryption program key is saved using a key encrypt key (KEK) in the CSD.

14. The method of claim 12, further comprising:

performing an additional encryption, at the CSD, on the encrypted encryption program key using a private key of the CSD ($PR_{csd}$) to generate an additionally encrypted encryption program key; and providing the additionally encrypted encryption program key to the user.

15. The method of claim 14, further comprising:

securely storing the encrypted encryption program key, by the user, after decrypting the additionally encrypted encryption program key with a public key of the CSD ($PU_{csd}$).

16. The method of claim 1, further comprising:

decrypting and extracting an identification (ID) of a user using the $PU_{ca}$; and storing the ID of the user in the secure download program format.

17. The method of claim 1, wherein the encryption program key is obtained by decrypting an encrypted encryption program key message using a private key of a user ($PR_{user}$).

18. The method of claim 1, wherein the encryption program key is obtained from a program key storage table that includes multiple entries, with each entry respectively including an identification (ID) of a user, the encryption program key, and a public key.

19. The method of claim 1, further comprising:

performing at least one of a vulnerability and a defectiveness check on the plain binary downloadable program;

in response to successfully performing the at least one of the vulnerability and the defectiveness check, generating the second hash value for the plain binary downloadable program and encrypting the second hash value using a private key of a certificate authority ($PR_{ca}$) to generate an encrypted second hash value; and storing the encrypted second hash value as the digital signature in the secure download program format.

* * * * *